(12) United States Patent
Roe et al.

(10) Patent No.: US 7,843,952 B2
(45) Date of Patent: Nov. 30, 2010

(54) EFFICIENT HANDLING OF HTTP TRAFFIC

(75) Inventors: Bryan Y. Roe, Camas, WA (US); Ylian Saint-Hilaire, Hillsboro, OR (US); Nelson F. Kidd, Camas, WA (US)

(73) Assignee: Intel Corporation, Santa Clara, CA (US)

( * ) Notice: Subject to any disclaimer, the term of this patent is extended or adjusted under 35 U.S.C. 154(b) by 1729 days.

(21) Appl. No.: 10/742,188

(22) Filed: Dec. 18, 2003

(65) Prior Publication Data

US 2005/0135352 A1   Jun. 23, 2005

(51) Int. Cl.
*H04L 12/56* (2006.01)
(52) U.S. Cl. .................. 370/412; 370/470; 709/203
(58) Field of Classification Search ............. 370/389, 370/392, 395.1, 401, 412, 470; 707/10; 709/202, 709/217, 223, 225, 226, 228, 237, 203; 713/152; 717/178
See application file for complete search history.

(56) References Cited

U.S. PATENT DOCUMENTS

| | | | | |
|---|---|---|---|---|
| 5,440,692 A | * | 8/1995 | Janicek | ................. 707/101 |
| 2002/0004796 A1 | * | 1/2002 | Vange et al. | ................. 707/10 |
| 2002/0007404 A1 | * | 1/2002 | Vange et al. | ................. 709/217 |
| 2002/0154645 A1 | * | 10/2002 | Hu et al. | ................. 370/401 |
| 2002/0157089 A1 | * | 10/2002 | Patel et al. | ................. 717/178 |
| 2003/0004688 A1 | * | 1/2003 | Gupta et al. | ................. 702/188 |
| 2003/0206519 A1 | * | 11/2003 | Sanders et al. | ............. 370/230 |
| 2005/0091244 A1 | * | 4/2005 | Marcotte | ................. 707/100 |
| 2005/0122971 A1 | * | 6/2005 | Morrison | ................. 370/389 |

* cited by examiner

*Primary Examiner*—Jason E Mattis
(74) *Attorney, Agent, or Firm*—Crystal D. Sayles (57) ABSTRACT

A transport engine and method. The transport engine including an async socket module to provide network communications, a client module, coupled to the async socket module and an application layer, to initiate outbound network communications, and a server module, coupled to the async socket module and the application layer, to handle inbound network communications. The client module and the server module utilize the async socket module to read and write data to and from a network. The async socket module includes a buffer having a variable buffer size to enable the async socket module to read data without having to copy the data. The async socket module, the client module, and the server module operate asynchronously on a single thread of execution.

18 Claims, 5 Drawing Sheets

EFFICIENT HANDLING OF HTTP TRAFFIC

FIELD OF THE INVENTION

The present invention is generally related to Internet technology. More particularly, the present invention is related to a system and method for efficient handling of HTTP (Hypertext Transfer Protocol) traffic.

DESCRIPTION

Extended Wireless PC (personal computer), digital home, and digital office initiatives are all based upon standard protocols that utilize HTTP (Hypertext Transfer Protocol) as their data transport. Traditional HTTP engines are complex and are not very suitable for embedded devices. Many device vendors are having difficulty incorporating an extensible HTTP transport into their devices because of the complexity and overhead of HTTP engines.

Available HTTP client/server stacks are not very small in footprint size. Those that are small in footprint size tend to be end-to-end solutions that are not reusable for different projects. Current solutions are based on blocking I/O (input/output) or on a multi-threaded system where maintenance and logic tend to be quite complex, resulting in bloated code size.

Thus, what is needed is a flexible and extensible HTTP engine that is reusable for any number of different usage scenarios. What is also needed is a flexible and extensible HTTP engine that accomplishes its functionality using significantly less resources. What is further needed is a flexible and extensible HTTP engine that requires little overhead, thereby enabling device vendors to incorporate an extensible HTTP transport into their devices.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrases "in one embodiment" or "in an embodiment" appearing in various places throughout the specification are not necessarily all referring to the same embodiment.

Embodiments of the present invention are directed to a flexible and extensible HTTP engine that handles HTTP traffic in a manner that is very efficient in its use of available resources. The HTTP engine may be reused for any number of different usage scenarios, yet does not require large amounts of overhead. The HTTP engine accomplishes this by using asynchronous communications so that everything may be executed on a single thread. This is also scalable to allow for the use of thread pooling technology.

Applications control which thread is utilized by the module. Multiple modules can be created that use different threads. The modules expose necessary properties to help the controlling application spread the workload across multiple modules. Embodiments of the present invention also allow for a zero memory copy of data from network layer to application layer in the majority of cases.

Figure 1:
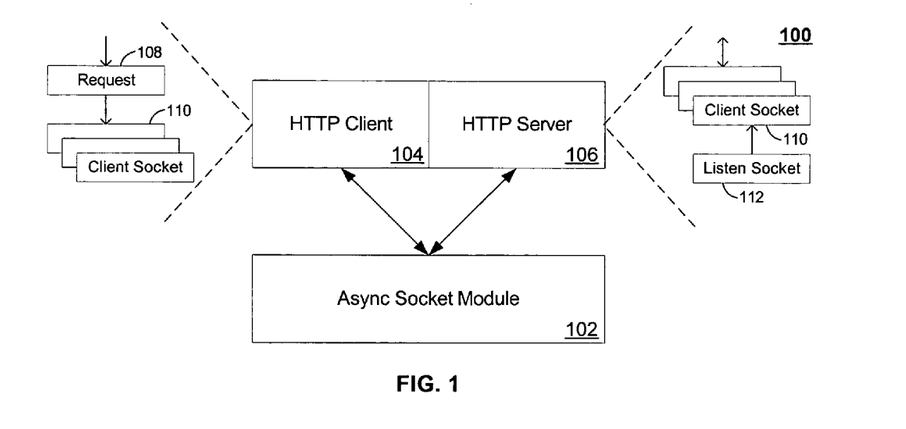
FIG. 1 is an exemplary block diagram of an HTTP transport engine according to an embodiment of the present invention.

FIG. 1 is an exemplary block diagram of an HTTP transport engine 100 according to an embodiment of the present invention. HTTP transport engine 100 comprises an async socket module 102, an HTTP client module 104, and an HTTP server module 106. Async socket module 102 is coupled to both HTTP client module 104 and HTTP server module 106. Modules 102, 104, and 106 are designed to utilize asynchronous communications such that communications can be accomplished on a single thread of execution.

Async socket module 102 serves as a network communications module. Async socket module 102 provides a way to read data from a network without, in many instances, having to copy data or by copying data as little as possible. Async socket module 102 includes a buffer (not shown) having a variable buffer size. The buffer size may grow dynamically in predetermined increments to accommodate the amount of data needed by HTTP client module 104 and HTTP server module 106. HTTP client module 104 and HTTP server module 106 utilize async socket module 102 to read/write data from/to a network.

HTTP client module 104 and HTTP server module 106 are very similar in design, with a few exceptions. HTTP client module 104 initiates outbound communications while HTTP server module 106 handles inbound communications. Another exception is that HTTP client module 104 uses a packet queue to store requests.

As shown in FIG. 1, HTTP client module 104 and HTTP server module 106 both utilize a fixed number of client sockets 110. HTTP client module 104 uses client sockets 110 to transfer data to async socket module 102, while HTTP server module 106 uses client sockets 110 to transfer data from async socket module 102.

Figure 2:
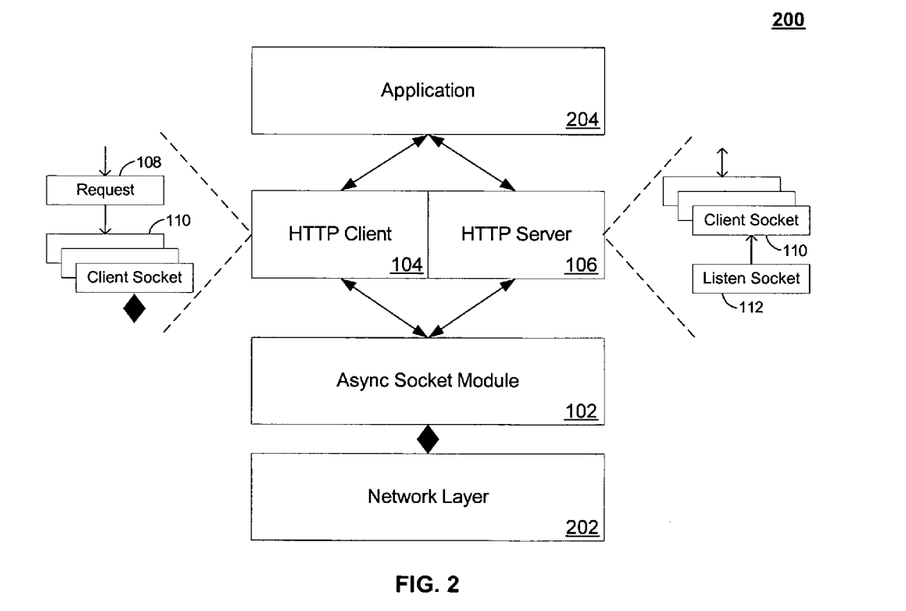
FIG. 2 is an illustration describing HTTP transport communications according to an embodiment of the present invention.

FIG. 2 is an illustration describing HTTP transport communications according to an embodiment of the present invention. As previously indicated, async socket module 102 serves as the network communications module, and is coupled to a network layer 202. Network layer 202 establishes, maintains, and terminates logical and physical connections among one or more networks. HTTP client module 104 and HTTP server module 106 utilize async socket module 102 to read/write data from/to a network via network layer 202.

Both HTTP client 104 and HTTP server 106 communicate with an application layer 204. Application layer 204 provides an interface between software running on a computer, such as a desktop, laptop, server, etc., and a network. Any requests 108 from application layer 204 are sent to async socket module 102 via HTTP client module 104. For HTTP server module 106, a listen socket 112 is used to listen for new communications being established between a network and an application.

When data is read from a network via network layer 202, async socket module 102 passes its buffer up to the next layer (i.e., HTTP client module 104 or HTTP server module 106). Async socket module 102 exposes start and end pointers so the next layer can dictate where in the buffer the next read cycle will write data, as well as how much data should be attempted to be read in the next cycle. Using the start and end pointers, when the start pointer is non-zero, or not equal to the end pointer, the buffer is shifted so that the buffer's start point is the start pointer, and the next layer is called again. This allows for easy handling of data streams where packets are variable length.

Client module 104 and server module 106 read data from async socket module 102 until they have read at least an entire HTTP header. At this point, the length of the HTTP body (the data portion of the HTTP packet) can be determined. The buffer can then be allocated to the precise size that is necessary to accommodate the body of the packet (or the data portion of the packet). If the length is still unknown, the buffer can be dynamically grown in predetermined increments. If the entire packet is determined to have already been read, the packet can be passed up to the next layer without any memory copying whatsoever. Otherwise, the body segment may be copied into the pre-allocated buffer. Async socket module 102 may then be instructed to read the appropriate number of bytes. The bytes that are read are written to the appropriate location into the pre-allocated buffer.

Client module 104 and server module 106 also utilize a fixed number of sockets. This results in dramatically smaller overhead than other solutions. Using a single thread and a fixed number of sockets, combined with a packet queue, results in high performance with the least amount of resource usage.

Network requests from HTTP client module 104 can be added from any thread for any network destination. Network requests are put into a queue, where they are sent onto the network when there is an available socket. Once communication is established with the network endpoint, client and server modules 104 and 106 act identically.

With incoming data, the application has a choice of waiting for the entire HTTP packet to be read or constantly resetting the pointers each time the reader is called. This allows for streaming the incoming data, which may be useful if the incoming data is of unknown or possibly large size since the entire contents are not stored in memory.

Figure 3A:
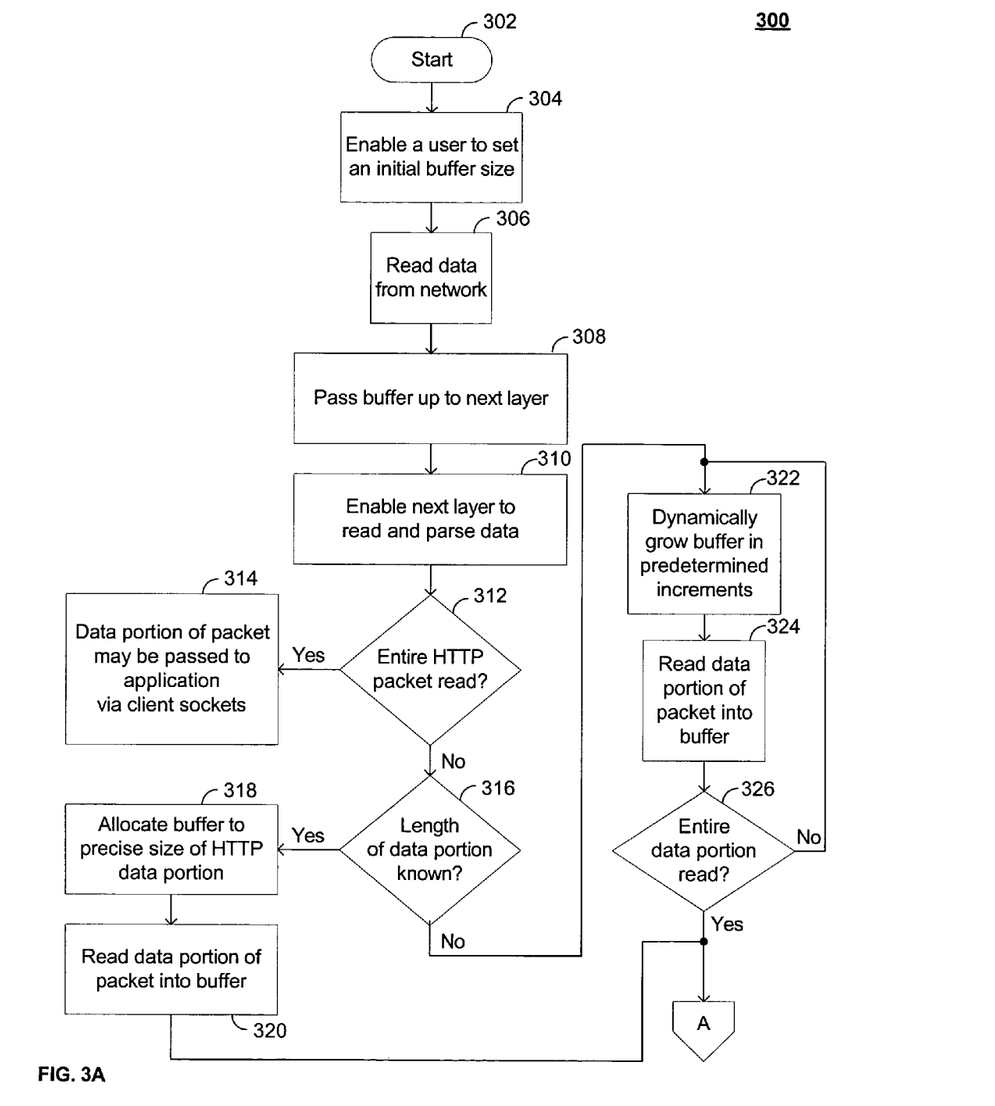
FIGS. 3A and 3B are a flow diagram describing an exemplary method for receiving data via an HTTP transport protocol according to an embodiment of the present invention.
Figure 3B:
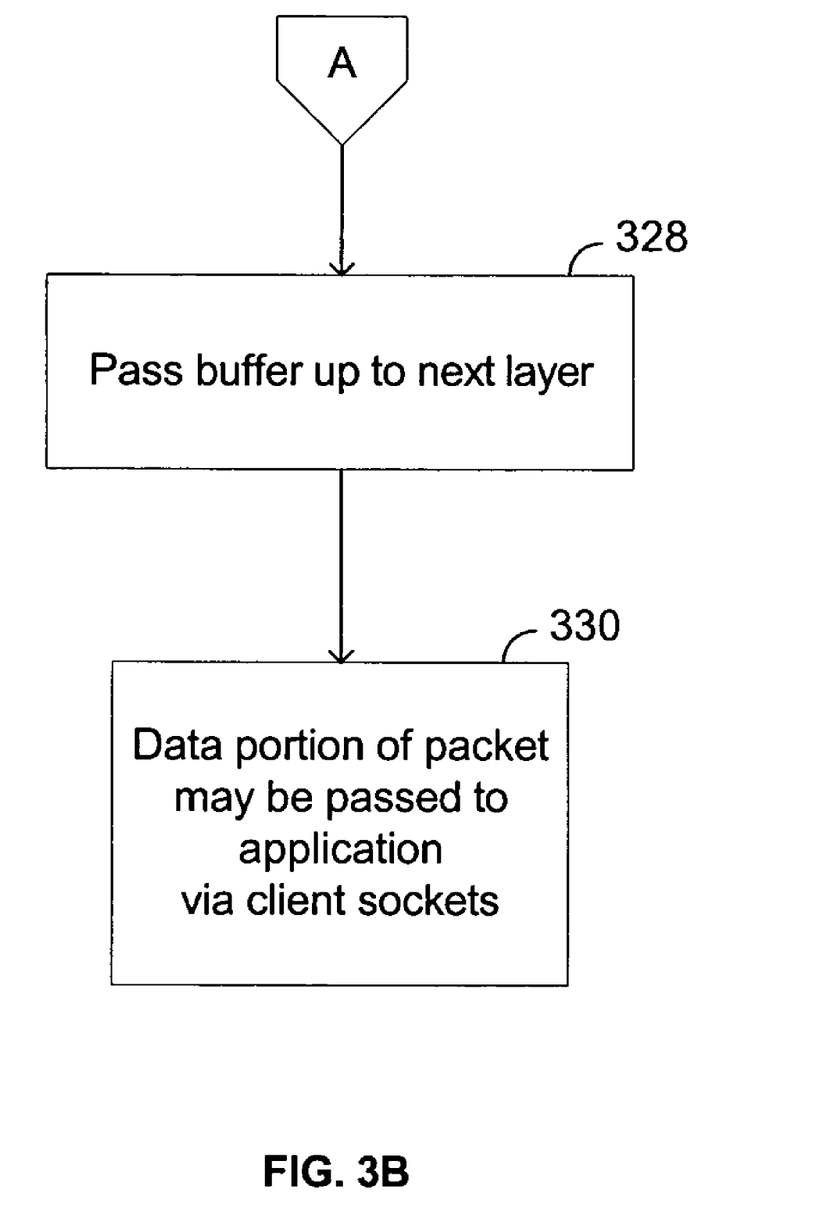

FIGS. 3A and 3B are a flow diagram 300 describing an exemplary method for receiving data over a network using HTTP transport protocol according to an embodiment of the present invention. The invention is not limited to the embodiment described herein with respect to flow diagram 300. Rather, it will be apparent to persons skilled in the relevant art(s) after reading the teachings provided herein that other functional flow diagrams are within the scope of the invention. The process begins with block 302 in FIG. 3A, where the process immediately proceeds to block 304.

In block 304, a user is enabled to set an initial buffer size for a buffer in async socket module 102. In block 306, data from the network is read into the buffer.

In block 308, the buffer is passed to the next layer. The next layer is either HTTP client module 104 or HTTP server module 106, depending upon whether data is being read for the client side or the server side, respectively. Passing the buffer to the next layer exposes start and end pointers to the next layer. The start and end pointers enable the next layer to dictate where in the buffer the next read cycle will write data, as well as how much data should be attempted to be read in the next cycle. When the start pointer is non-zero, or not equal to the end pointer, the buffer is shifted so that the buffer's start point is the start pointer, and the next layer is called again. This allows for easy handling of data streams where packets are variable length.

In block 310, the next layer (i.e., HTTP client module or HTTP server module) is enabled to read and parse the data in the buffer. HTTP client module 104 and HTTP server module 106 will read data until they have read at least an entire HTTP header. Once the entire HTTP header has been read, the length of the data portion may then be determined. Parsing of the data is further described below with reference to FIG. 5.

In decision block 312, it is determined whether the entire HTTP packet has been read by either HTTP client module 104 or HTTP server module 106. If it is determined that the entire HTTP packet has been read, then the data portion of the packet is available to be passed to application 204 in block 314.

Returning to decision block 312, if it is detemined that the entire HTTP packet has not been read, the process proceeds to decision block 316. In decision block 316, it is determined whether the length of the data portion of the HTTP packet is known. If the length of the data portion of the HTTP packet is known, the process proceeds to block 318.

In block 318, the buffer for async socket module 102 is allocated for the precise size of the HTTP data portion of the packet. Once the buffer is allocated, either HTTP client module 104 or HTTP server module 106 gives the buffer back to async socket module 102 to read the entire data portion of the HTTP packet. This enables writing to the buffer once, thereby eliminating the need to keep copying sections to and from the buffer when a fixed size buffer is used.

In block 320, async socket module 102 reads the data portion of the HTTP packet into the buffer. The process then proceeds to block 328 in FIG. 3B.

Returning to decision block 316 in FIG. 3A, if it is determined that the length of the data portion of the HTTP packet is unknown, the process proceeds to block 322. In block 322, the buffer from async socket module 102 is dynamically grown in predetermined increments. In block 324, the data portion of the HTTP packet is read into the pre-allocated buffer.

In decision block 326, it is determined whether all of the data portion of the HTTP packet has been read into the buffer. If it is determined that all of the data portion of the HTTP packet has not been read into the buffer, then the process proceeds back to block 322, where the buffer may be dynamically grown to accommodate more data.

In an embodiment where the incoming data size is unknown or is of a large size, an application may choose to wait until the entire HTTP packet has been read or may stream the incoming data. In the case where the incoming data is streamed, the start and end pointers are constantly reset each time more data is read into the buffer.

Returning to decision block 326, if it is determined that all of the data portion of the HTTP packet has been read into the buffer, then the process proceeds to block 328 in FIG. 3B.

In block 328, the buffer is passed up to the next layer. Again, the next layer may refer to HTTP client module 104 or HTTP server module 106, depending upon whether data is being read into the client side of the network or the server side of the network, respectively. The process then proceeds to block 330. In block 330, the data portion of the HTTP packet may be passed to application 204.

Figure 4:
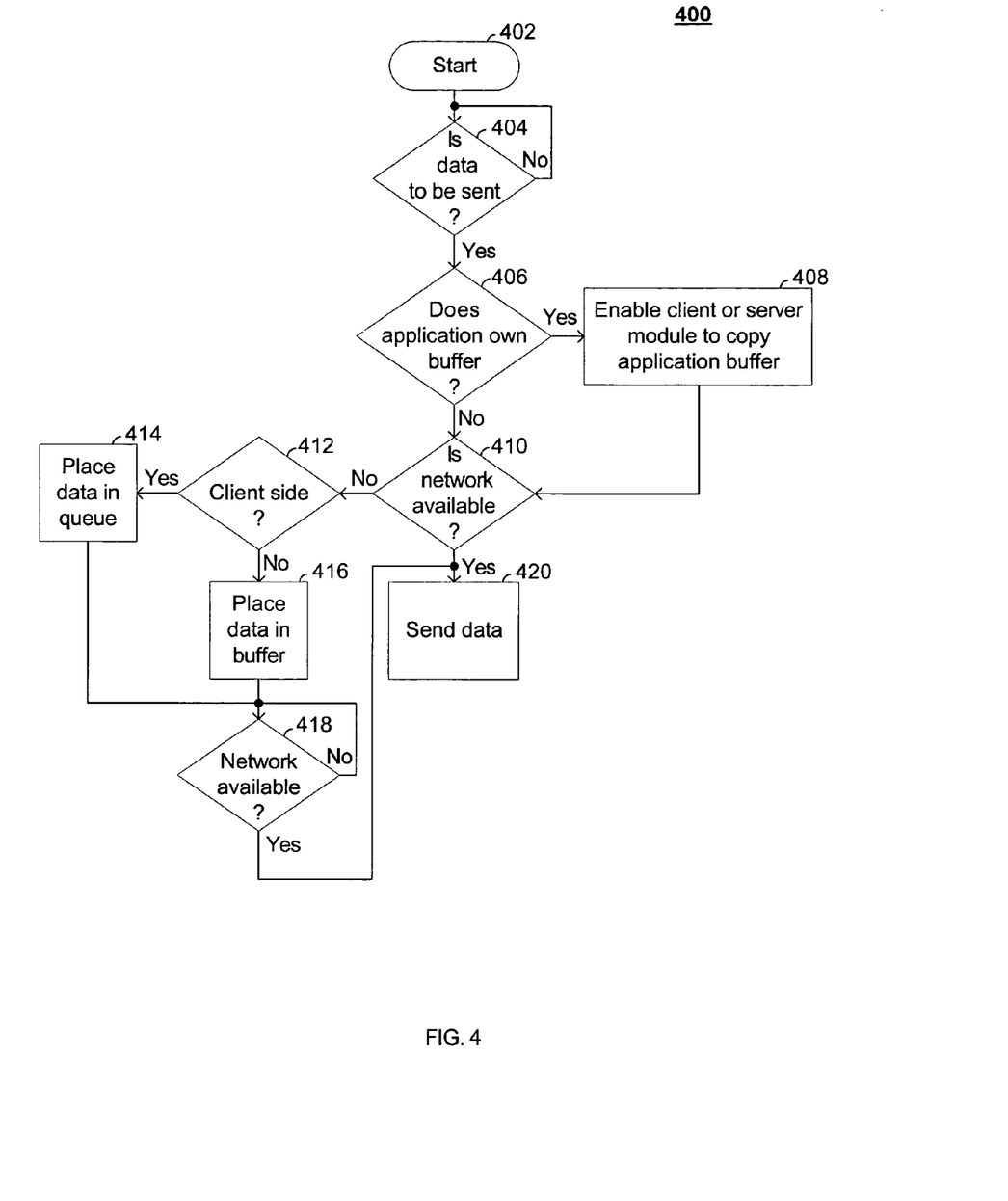
FIG. 4 is a flow diagram describing an exemplary method for sending data via an HTTP transport protocol according to an embodiment of the present invention.

FIG. 4 is a flow diagram 400 describing an exemplary method for sending data via an HTTP transport protocol according to an embodiment of the present invention. The invention is not limited to the embodiment described herein with respect to flow diagram 400. Rather, it will be apparent to persons skilled in the relevant art(s) after reading the teachings provided herein that other functional flow diagrams are within the scope of the invention. The process begins with block 402, where the process immediately proceeds to decision block 404.

In decision block 404, it is determined whether an application has data to be sent over the network. If an application does not have data to be sent over the network, the process remains at block 404 until an application has data to be sent over the network. If an application has data to be sent over the network, then the process proceeds to decision block 406.

In decision block 406, it is determined whether the application owns the buffer that contains the data. If it is determined that the application owns the buffer that contains the data, the process proceeds to block 408.

In block 408, the application sends a pointer to either HTTP client module 104 or HTTP server module 106, depending on which side of the network (that is, client side or server side) is sending data, to enable either module 104 or 106 to copy the data from the application buffer. The process then proceeds to decision block 410.

Returning to decision block 406, if it is determined that the application does not own the buffer that contains the data, the process proceeds to decision block 410.

In decision block 410, it is determined whether the network is available to send the data. If it is determined that the network is not available to send the data, the process proceeds to decision block 412.

In decision block 412, it is determined whether the data is being sent from the client side of the network. If the data is being sent from the client side of the network, the data is placed in a queue until the network is available to send the data (block 414). If the data is not being sent from the client side (i.e., it is being sent from the server side), then the data is placed in a buffer until the network is available to send the data (block 416). The process then proceeds to decision block 418.

In decision block 418, it is determined whether the network is now available. If the network is now available, the process proceeds to block 420. If the network is not now available, then the process remains at decision block 418 until the network becomes available.

Returning to decision block 410, if it is determined that the network is available, the process proceeds to block 420. In block 420, the data is sent over the network.

As previously indicated, parsing is performed by HTTP client module 104 and HTTP server module 106 in a similar manner. Modules 104 and 106 parse the HTTP packet header using very few resources. In fact, modules 104 and 106 apply a zero copy string parser. Thus, data is written to the buffer once and never copied. Instead of copying the buffer, modules 104 and 106 generate pointers to locations in the original HTTP header.

Figure 5:
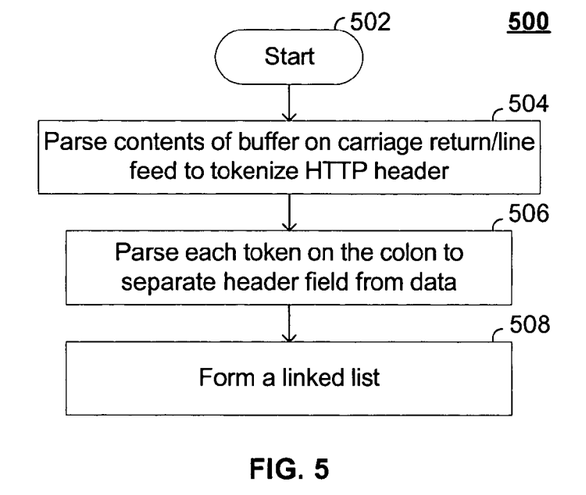
FIG. 5 is a flow diagram describing an exemplary method for parsing an HTTP packet according to an embodiment of the present invention.

FIG. 5 is a flow diagram 500 describing an exemplary method for parsing an HTTP packet according to an embodiment of the present invention. The invention is not limited to the embodiment described herein with respect to flow diagram 500. Rather, it will be apparent to persons skilled in the relevant art(s) after reading the teachings provided herein that other functional flow diagrams are within the scope of the invention. The process begins with block 502, where the process immediately proceeds to block 504.

In block 504, the contents of the buffer are parsed using a carriage return/line feed combination. This tokenizes the HTTP header into its corresponding header fields.

In block 506, each token or header field is parsed using a colon to separate the header field from its corresponding data. Everything before the colon is referred to as the name of the header field, which represents a pointer to the original location of the header field. Everything after the colon represents the data.

In block 508, a linked list of the header fields is generated. The linked list includes the pointers to all of the fields in the header as well as a pointer to the data portion of the data packet. When an application requests a value for one of the header fields, the linked list is searched to obtain the pointer. The pointer then points back to the original HTTP header to obtain the data for the corresponding header field.

Figure 6:
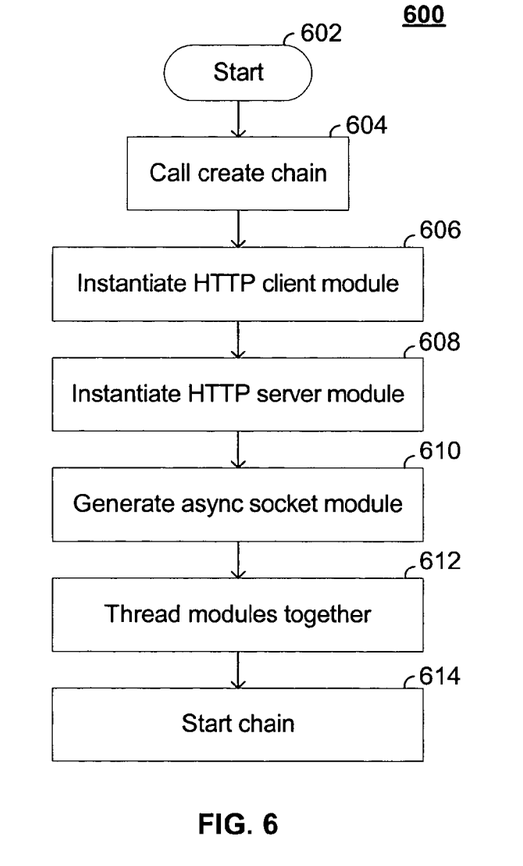
FIG. 6 is a flow diagram describing an exemplary method for implementing a single thread of execution for an HTTP engine according to an embodiment of the present invention.

FIG. 6 is a flow diagram 600 describing an exemplary method for implementing a single thread of execution for an HTTP engine according to an embodiment of the present invention. The invention is not limited to the embodiment described herein with respect to flow diagram 600. Rather, it will be apparent to persons skilled in the relevant art(s) after reading the teachings provided herein that other functional flow diagrams are within the scope of the invention. The process begins with block 602, where the process immediately proceeds to block 604.

In block 604, a create chain routine is called. The create chain routine provides a thread for execution.

In block 606, HTTP client module 104 is instantiated. Next, HTTP server module 106 is instantiated in block 608. Together, HTTP client module 104 and HTTP server module 106 generate async socket module 102 in block 610.

In block 612, each of modules 104, 106, and 102 are threaded together. The process then proceeds to block 614.

In block 614, the chain is started. Upon starting the chain, each of modules 102, 104, and 106 work asynchronously. For example, if there is nothing to read from async socket module 102, then execution moves to the next component on the thread, which is HTTP client 104, to see if there is any work to be done. If there is no work to be done with HTTP client 104, then the next component (i.e., HTTP server 106) is examined to see if any work needs to be done with that component. Thus, each module is checked to determine whether work needs to be done. If no work needs to be done with any particular module, the next module on the thread is checked regardless if work needs to be done or not. Thus, executing each module on a single thread gets as much work done as possible.

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include a processor and a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, and the like. Embodiments of the present invention may also be practiced in distributed computing environments where tasks may be performed by remote processing devices that are linked through a communications network. Also, embodiments of the present invention may be implemented to merely serve content from a local storage medium, thereby eliminating the need for at least one input device and one output device.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A transport method comprising:
reading a data packet from a network into a buffer in an async socket module, the async socket module serving as a network communications module;
passing the buffer to a HTTP module;
enabling the HTTP module to read and parse the data in the buffer without copying the buffer, wherein the HTTP module reads data until at least an entire header of the data packet is read;
determining whether the entire data packet has been read; and
if the entire data packet has not been read and a length for a data portion of the data packet is known, then enabling the HTTP module to allocate a buffer size for the buffer to accommodate the data portion of the data packet and send the buffer back to the async socket module to read and write the data portion of the data packet to the buffer once, wherein the HTTP module comprises one of an HTTP client module for initiating outbound communications or an HTTP server module for handling inbound communications, and wherein the async socket module, the HTTP client module and the HTTP server module are threaded together, each module using asynchronous communications to communicate on a single thread of execution.

2. The method of claim 1, wherein if the entire data packet has not been read and a length for the data portion of the data packet is unknown, then enabling the HTTP module to pre-allocate the buffer size by dynamically growing the buffer size in predetermined increments; sending the buffer to the async socket module to read and write the data portion of the data packet into the buffer, wherein if the data portion of the data packet does not fit into the buffer, then continuing to dynamically grow the buffer size in predetermined increments until the data portion fits the buffer.

3. The method of claim 2, further comprising:
passing the buffer up to the HTTP module; and
enabling the data portion of the packet to be passed to an application.

4. The method of claim 1, wherein if the entire data packet has been read, then sending the data portion of the data packet to an application.

5. The method of claim 1, wherein passing the buffer to a HTTP module exposes start and end pointers to the HTTP module, the start and end pointers enabling the HTTP module to dictate where in the buffer a next read cycle will write data as well as how much data can be written in the next read cycle.

6. The method of claim 5, wherein if the start pointer is not zero and is not equal to the end pointer, the buffer is shifted to make a start point of the buffer equal to the start pointer.

7. The method of claim 5, wherein if the entire data packet has not been read and a length for the data portion of the data packet is unknown, then enabling the HTTP module to pre-allocate the buffer size by dynamically growing the buffer size in predetermined increments; sending the buffer to the async socket module to read and write the data portion of the data packet into the buffer and pass the buffer back to the HTTP module, wherein if an application chooses to stream the incoming data, then resetting the start and end pointers each time the async socket module reads and writes data into the buffer.

8. The method of claim 1, further comprising:
passing the buffer up to the HTTP module; and
enabling the data portion of the packet to be passed to an application.

9. The method of claim 1, wherein enabling the HTTP module to read and parse the data in the buffer without copying the buffer comprises:
parsing data in the buffer using a carriage return/line feed combination to tokenize the header;
parsing each token using a colon to separate header fields from header field data; and forming a linked list of the header fields, the linked list including pointers to all of the fields in the header and a pointer to the data portion of the data packet, wherein when an application requests a value for one of the header fields, the linked list is searched to obtain the pointer, wherein the pointer points back to the location in the header to obtain the data for the header field.

10. An article comprising: a computer readable storage medium having a plurality of machine accessible instructions, wherein when the instructions are executed by a processor, the instructions provide for reading a data packet from a network into an async socket module, the async socket module serving as a network communications module;
  passing the buffer to a HTTP module;
  enabling the HTTP module to read and parse the data in the buffer without copying the buffer, wherein the HTTP module reads data until at least an entire header of the data packet is read;
  determining whether the entire data packet has been read; and
  if the entire data packet has not been read and a length for a data portion of the data packet is known, then enabling the HTTP module to allocate a buffer size for the buffer to accommodate the data portion of the data packet and send the buffer back to the async socket module to read and write the data portion of the data packet to the buffer once, wherein the HTTP module comprises one of an HTTP client module for initiating outbound communications or an HTTP server module for handling inbound communications, and wherein the async socket module, the HTTP client module and the HTTP server module are threaded together, each module using asynchronous communications to communicate on a single thread of execution.

11. The article of claim 10, wherein if the entire data packet has not been read and a length for the data portion of the data packet is unknown, then further comprising instructions for enabling the HTTP module to pre-allocate the buffer size by dynamically growing the buffer size in predetermined increments; sending the buffer to the async socket module to read and write the data portion of the data packet into the buffer, wherein if the data portion of the data packet does not fit into the buffer, then continuing to dynamically grow the buffer size in predetermined increments until the data portion fits the buffer.

12. The article of claim 11, further comprising instructions for passing the buffer up to the HTTP module and enabling the data portion of the packet to be passed to an application.

13. The article of claim 10, wherein if the entire data packet has been read, then further comprising instructions for sending the data portion of the data packet to an application.

14. The article of claim 10, wherein passing the buffer to a HTTP module exposes start and end pointers to the HTTP module, the start and end pointers enabling the HTTP module to dictate where in the buffer a next read cycle will write data as well as how much data can be written in the next read cycle.

15. The article of claim 14, wherein if the start pointer is not zero and is not equal to the end pointer, the buffer is shifted to make a start point of the buffer equal to the start pointer.

16. The article of claim 14, wherein if the entire data packet has not been read and a length for the data portion of the data packet is unknown, then further comprising instructions for enabling the HTTP module to pre-allocate the buffer size by dynamically growing the buffer size in predetermined increments; sending the buffer to the async socket module to read and write the data portion of the data packet into the buffer and pass the buffer back to the HTTP module, wherein if an application chooses to stream the incoming data, then resetting the start and end pointers each time the async socket module reads and writes data into the buffer.

17. The article of claim 10, further comprising instructions for:
  passing the buffer up to the HTTP module; and
  enabling the data portion of the packet to be passed to an application.

18. The article of claim 10, wherein instructions for enabling the HTTP module to read and parse the data in the buffer without copying the buffer comprises instructions for:
  parsing data in the buffer using a carriage return/line feed combination to tokenize the header;
  parsing each token using a colon to separate header fields from header field data; and
  forming a linked list of the header fields, the linked list including pointers to all of the fields in the header and a pointer to the data portion of the data packet, wherein when an application requests a value for one of the header fields, the linked list is searched to obtain the pointer, wherein the pointer points back to the location in the header to obtain the data for the header field.

* * * * *